United States Patent [19]
Lucas et al.

[11] 3,889,267
[45] June 10, 1975

[54] RADIO INTERFEROMETER

[75] Inventors: David Adrian Lucas; Richard Paul Vincent, both of Salfords, near Redhill, England

[73] Assignee: U.S. Philips Corporation, New York, N.Y.

[22] Filed: May 11, 1973

[21] Appl. No.: 359,227

[30] Foreign Application Priority Data
May 17, 1972 United Kingdom............... 23110/72

[52] U.S. Cl............................................. 343/113 R
[51] Int. Cl............................................. G01s 3/48
[58] Field of Search......... 343/113 R, 108; 324/83 D

[56] References Cited
UNITED STATES PATENTS

| | | | |
|---|---|---|---|
| 3,246,327 | 4/1966 | Vogel............................ | 343/113 R |
| 3,742,505 | 6/1973 | Rocke............................ | 343/113 R |
| 3,787,863 | 1/1974 | Watamabe et al.............. | 343/113 R |
| 3,803,612 | 4/1974 | Alcock........................... | 343/113 R |

*Primary Examiner*—Maynard R. Wilbur
*Assistant Examiner*—Richard E. Berger
*Attorney, Agent, or Firm*—Frank R. Trifari; George B. Berka

[57] ABSTRACT

An interferometer system for measuring the elevation angle of a remote radio source, comprising a linear array of equallyspaced aerial elements, a series of phase discriminators, each coupled to a common aerial and to one of the other aerials in order to measure phase differences between the incident waves, and signal processing units for averaging out the measured phase differences and to derive therefrom an indication of the elevation angle of the radiation incident on the aerial array.

9 Claims, 24 Drawing Figures

RADIO INTERFEROMETER

This invention relates to an interferometer system for measuring the vertical angle of a remote radio source: the invention is particularly directed toward the problem of indicating small angles above the horizon such as is necessary for example in aircraft landing systems.

In a vertical interferometer, measurement of elevation angle on targets near the horizon presents a difficult problem because of the effect of ground reflections upon the phase angle measured by the interferometer. At low angles of incidence the reflection coefficient for a typical terrain tends to approach unity and this gives rise to a vertical interference pattern with phase discontinuities which approach 180° at amplitude nulls so that angle measurements which rely upon phase difference measurement between two aerial elements are subject to phase errors that may approach this figure. The basic considerations involved are conveniently set out in "Microwave Engineering" by A. F. Harvey, Academic Press, 1963, at page 1066, see particularly FIG. 23.2 and the problem is considered also in somewhat greater detail in a communication by D. K. Barton in proceedings I.E.E.E. 1965 page 543. Barton shows in his FIG. 2 how the measured phase difference in the presence of ground reflections may differ very significantly from the true phase difference which would be measured in the absence of those reflections.

According to the present invention a vertical radio interferometer system comprises a vertically-extending rectilenear array of equally-spaced aerial elements forming between a common element and each of the other elements respectively a plurality of interferometer pairs of which the spacing increases in arithmetical progression, a series of phase discriminators each associated with a respective interferometer pair to derive therefrom a respective phase-difference measurement in digital form and digital logic means to derive from the series of respective measurements an average phase measurement represenative of the vertical angle $\theta$ of radiation incident on the aerial array. Suitably, each phase discriminator is operative to compare signals having a phase difference of $\delta\phi = 2\pi(I + F)$ radians where I is an integer and F is a positive fraction and to derive therefrom a digital measurement of the angle $2\pi F$, and wherein the digital logic means is operative to calculate the angle $2\pi I$, and to add thereto the measurement derived by the discriminator to provide a measurement in digital form of the phase difference $\delta\phi$.

The digital logic means may comprise a series of digital logic stages each associates with a respective pair of adjacent phase discriminators in the series of discriminators, each logic stage being operative to receive the digital measurements from the pair of discriminators and to calculate therefrom the angle $2\pi I$, and a further digital logic stage associated with only that discriminator which is associated with the closest spaced interferometer pair.

An embodiment of the invention will now be described, by way of example, with reference to the accompanying diagrammatic drawings in which.

Figures 1, 2:
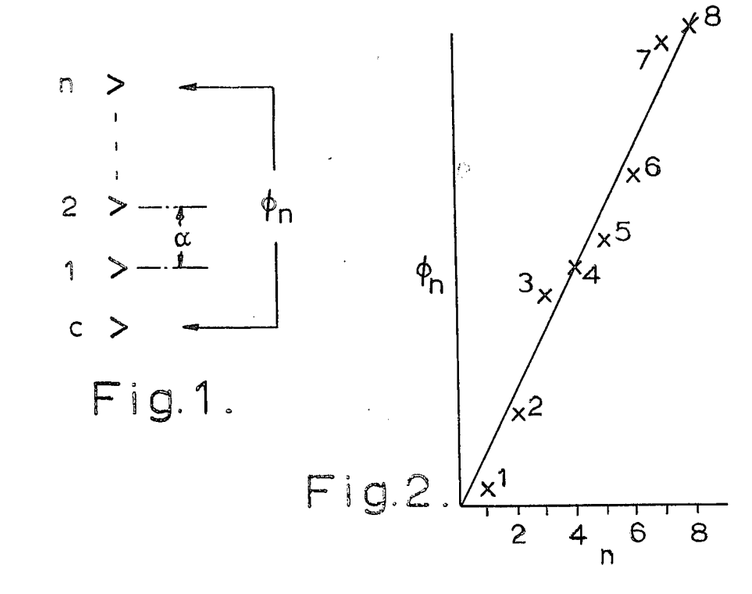
FIG. 1 : illustrates a vertical array of interferometer aerial elements.
FIG. 2 : is a phase-height graph.

Referring to FIG. 1, consider a vertically extending aerial array consisting of a number of equally-spaced receiver aerials, here shown in form of horns. Let phase measurements be made between the lowest, common, aerial element c and each of the others. The phases thus measured may now be plotted on a phase-height graph as illustrated in FIG. 2, where the phase $\phi_n$ measured between the common element c and the nth element is plotted vertically and where the spacing between c and the nthe element is plotted horizontally; since the elements are equally-spaced by a distance d, see FIG. 1, then the height that is to say the vertical spacing $n \cdot d$ is proportional to n. The deviation of the plotted points from a straight line is caused by wave-front perturbation due to ground reflections but a straight line which passes through the origin may be drawn in the region of these points so as to give an average slope indicating the variation of phase $\phi$ with the spacing between the aerial elements of the interferometer pairs.

Consier now the phase difference $\phi_n$ between the common element c and the nth element, so that we may write $$\phi_n = 2\pi nd \sin\theta / \lambda \qquad \text{(i)}$$

where $\lambda$ = wavelength of received signal, $\phi$ = elevation angle of received signal, $d$ = spacing between adjacent elements.

From which $$\text{Slope} = \phi_n/nd = 2\pi \sin\theta / \lambda \qquad \text{(ii)}$$

Thus we see that if we can estimate the average slope then we can estimate the elevation angle.

In the general case, assuming no prior knowledge of the site conditions, we may assume that errors on all pairs are equally likely so that all measurements must be given equal weight. Let us now write down some estimates of the slope between pairs of equally-spaced elements.

First estimate = $E_1 = (\phi_7 - \phi_3) / 4d$

Second estimate = $E_2 = (\phi_6 - \phi_2) / 4d$

Third estimate = $E_3 = (\phi_5 - \phi_1) / 4d$

Fourth estimate = $E_4 = \phi_4 4d$

Fifth estimate = $E_5 = (\phi_8 - \phi_4) / 4d$

From these five estimates we may derive two sets, one comprising the first, second, third and fourth and the other comprising the first, second, third and fifth, each set of estimates involving each element once; however, since the set which includes the fifth estimate requires a separate element to measure $\phi_8$, let us consider the set comprising the first four estimates. From this set we can derive an average estimate of the slope in the form $$\text{slope} = (E_1 + E_2 + E_3 + E_4) / 4$$

and combining this with equation (ii) we may derive the expression $$\sin \theta = \beta [(\phi_7 + \phi_6 + \phi_5 + \phi_4) - (\phi_3 + \phi_2 + \phi_1)]$$

(iii)

where $\beta = \lambda/32\pi d$ and is a constant scaling factor

There are of course ways of deriving an average measurement other than that instanced above in which an average slope is derived from what conveniently may be called incremental slopes that is to say the slopes between a number of pairs of equally-spaced elements.

For example, we could take the average of the slopes defined by the individual elements with reference to the common element $c$ so as to produce an average estimate of the form $$(1/n.d.) (\phi_1 + \phi_2/2 + \phi_3/3 \ldots \phi_n/n)$$

or more simply $$(1/n.d) \Sigma \phi_n/n$$

(iii) (a)

Another method is to fit the best straight line through the origin and all the points, as shown in FIG. 2, in which case the slope of this line can be denoted by $\Sigma\phi_n/d\Sigma n$ (iii) (b)

which for an eight element array ($n = 7$) gives a value $$(\Sigma \phi_n) 28d$$

In practice, for difficult sites, the performance of the system can be improved by incorporating a weighting procedure favouring the phase measurements known to be accurate by a site investigation.

Let us now consider the process of phase measurement in greater detail. The phase difference at the closest spaced pair by given by $$\phi_1 = 2\pi d \sin \phi/\lambda$$

(iv)

In a range of angles such that $\sin \theta$ is less than $\lambda/d$, $\phi_1$ lies between 0 and $2\pi$ and is therefore unambiguous. Over the same range, $\phi_2$ to $100_n$ measured at the other interferometers are all ambiguous unless $\sin \theta$ is less than $\lambda/n.d$. In general $$\phi_n = 2\pi (I_n + F_n)$$

where $F_n$ is a fraction between 0 and 1, $I_n$ is an integer

The phase discriminator can only measure $2\pi F_n$, and on the closest spaced pair $\phi_1 = 2 \pi F_1$, since $I_1 = 0$. On other pairs the integer part $I_n$ is unknown and must be determined before each value of $\phi_n$ is known.

Consider two phases $\phi_n = (I_n + F_n) 2\pi$
and
$\phi_{n+1} = (I_{n+1} + F_{n+1}) 2\pi$ It will be /$\phi$that provided /l$\phi_{n+1} - \phi_n$/, hereinafter denoted by /$\delta\phi$/, is less than $\pi$, that is to say the modulus of the expression $(I_{n+1} + F_{n+1}) - (I_n + F_n)$ is less than one-half, $I_{n+1}$ and hence $\phi_{n+1}$ may be determined by knowledge of $I_n$, $F_n$ and $F_{n+1}$.

Taking the four examples shown in FIGS. 3a to 3d all of which comply with this proviso it can be seen that
in example I (FIG. 3a) $I_{n+1} = I_n$
in example II (FIG. 3b) $I_{n+1} = I_n$
in example III (FIG. 3c) $I_{n+1} = I_n + 1$
in example IV (FIG. 3d) $I_{n+1} = I_n - 1$ When $I_{n+1} = I_n \pm 1$ the vectors are spread around the dotted line, which we may call the 12 o'clock position, and when $I_{n+1} = I_n$ the vectors are not spread around the 12 o'clock position.

Hence, if $F_n$ and $F_{n+1}$ are known by measurement then $\phi_{n+1}$ can be found as follows:
$\phi_{n+1} = \phi_n + \delta\phi$ where
$\delta\phi = (\delta F + B) 2 \pi$ (v)

where for vectors spread around the 12 o'clock position
$B = 1$ for $\delta F$ negative
and
$B = -1$ for $\delta F$ positive
where for vectors not spread around the 12 o'clock position
$B = 0$
where
$\delta F = F_{n+1} - F_n$
and where B represents $I_{n+1} - I_n$ and can be conveniently represented as $$\delta I = I_{n+1} - I_n = B$$

For the ambiguous condition of vector spreads equal to $\pi$, the equality /$\delta F$/ = ½ holds. This only arises when $\theta$ approaches the maximum angle $\theta_o$ which can be measured without ambiguity, and so the processing logic must resolve this ambiguity in favour of this condition by the further requirement $$\phi_{n+1} = \phi_n + /\delta F/.2 \pi$$

Combining these requirements, the complete processing is $$\phi_{n+1} = \phi_n + \delta\phi \text{ where}$$
$$\delta\phi = (A/\delta F/+B + C\delta F).2 \pi$$

(vi)

where
a. $A = 0, B = 0, C = 1$,
  for /$\delta F$/ less than ½
b. $A = 1, B = 0, C = 0$,
  for /$\delta F$/ = ½
c. $A = 0, B = 1, C = 1$,
  for /$\delta F$/ greater than ½
  and $\delta F$ negative
d. $A = 0, B = 1, C = 1$,
  for /$\delta F$/ greater than ½
  and $\delta F$ positive It should here be noted that since /$\delta\phi$/ is less than $\pi$ then coincident vectors are not ambiguous.

It is convenient now to consider in greater detail the operation of the system in the presence of ground reflections, bearing in mind the proviso mentioned above that $/\delta\phi/$ is less than $\pi$. The errors in measurements made between the common aerial element $c$ and any other element $n$ are first those arising from interfering ground reflections at each element which will be denoted as G with the subscript appropriate to each particular element, and the error in the digital circuits which digitize the phase-difference between elements $c$ and another element which will denoted by D with the subscript appropriate to the element other than the common element of the pair.

Thus we may write $$\phi_n = 2\pi \, n \, d \sin \theta/\lambda \pm (G_n - G_c) \pm D_n$$

and $$\phi_{n+1} = 2\pi \, (n+1) \, d \sin 0/\lambda \pm (G_{n+1} - G_c) \pm D_{n+1}$$

Let $/G_n/ = G_{n+1}/ = G$
and $/D_n/ = /D_{n+1}/ = D/2$ that is to say half the phase digital increment. The phase digital increment is the increment in $\phi$ represented by unit increment of its digital indication; examples of such digitizing using modified output signals -F', -H', E' and G' from hybrid junctions are given in Table 1, which shows increments of $\pi/4$, that is 45°, set out as a four-bit Johnson code "truth table." For convenience, the outputs are headed in Table 1 also by designations such as C ($\phi$) and S($\phi$), defined in that C($\phi$) = 0 if cos $\phi$ is positive and 1 if cos $\phi$ is negative, similarly for S ($\phi$). These designations thus give the trigonometrical significance (as regards phase difference) of the outputs.

The code contains eight unique combinations out of a possible 16 combinations with four digits and only one digit changes at a time. In another method of deriving a digital indication of phase the discriminator incorporates a length of delay-line having four tapping points; in the present system a discriminator with a digital increment of 45° gives adequate resolution and one convenient form is that of the four-tap delay line.

Assuming that the total errors are at a maximum we may write $$/\delta\phi/ = 2\pi \, d \sin \theta/\lambda \pm 2 \, G + D$$

(vii)

and this expression must be less than $\pi$ for correct operation.

G depends on a number of parameters including array geometry and terrain characteristics and varies with angle for two reasons. First, the ground reflection coefficient falls rapidly with increasing angle over most terrains: secondly, as angle increases, the ground reflected signal is increasingly attenuated because the angle between the aerial main beam axis and the reflected wave increases. In practice the second effect predominates and as a result G becomes very small above about five degrees for all surfaces as can be seen from FIG. 4 which shows at $a$ the general form of the limits of the graph of the modulus of the function 2G plotted against elevation angle $\theta$ for the proposed array over flat Bedford clay — known to be a difficult terrain. This curve is derived from a plot produced by computer simulation based on known ground parameters.

Figure 4:
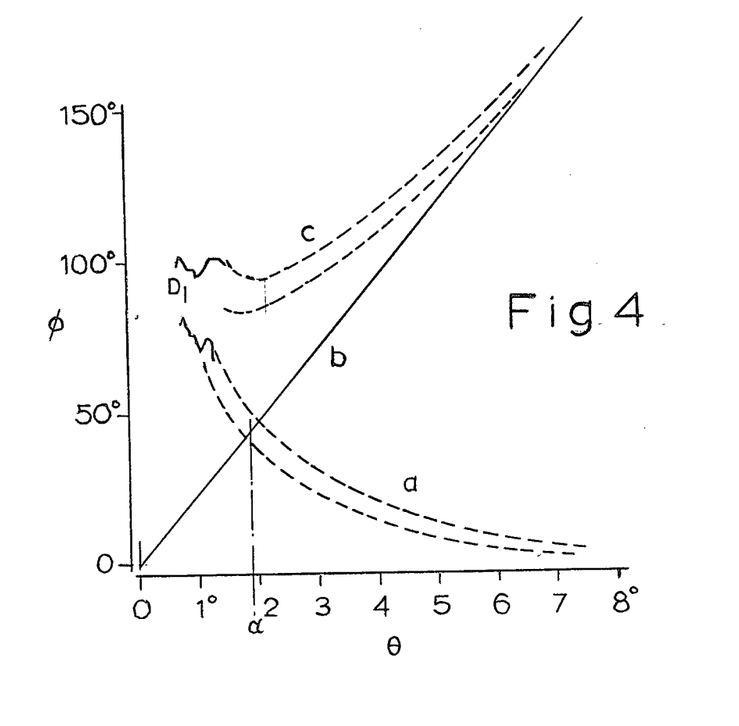
FIG. 4 : illustrates the variation of measured phase $\phi$ with elevation angle $\theta$.

FIG. 4 also shows at $b$ the line representing $2 \pi d \sin \theta/\lambda$; it will be noted that as the horizontal axis of FIG. 4 caters only for elevation angles $\theta$ of up to 8°, then since at these small angles $\theta = \sin \theta$ for all practical purposes, $2 \pi d \sin \theta/\lambda$ is directly proportional to $\theta$ and therefore $b$ is a straight line. If the graphs $a$ and $b$ are added so as to produce a sum graph representing $2 \pi d \sin \theta/\lambda + 2G$ and of which the general form is indicated at $c$, it will be found that for angles $\theta$ of about 4° or less the peak of the sum graph $c$ will occur at the same values of $\theta$ as that for the first two peaks of graph $a$; in this instance these peaks of the sum graph $c$ attain an angle $\phi$ of about 100° at elevations $\theta$ of about 0.7 and 1.2°, these values of $\phi$ comprising approximately 20° or more attributable to the effect of graph $b$ and approximately 80° or less attributable to graph $a$. Above an elevation of 4° the influence of ground reflections becomes of minimal importance, and the sum graph $c$ becomes asymptotic to the line $b$.

Thus, for elevation angles of less than about 4° there is a margin of about 80°, in the measurement of $\phi$, available to cater for the instrumental that is to say digitizing errors represented by D. Since this error can reliably be assumed not to exceed the digital increment, see above, of 45° this margin of 80° is ample to accommodate the instrumental errors at these elevation angles.

It will of course be appreciated that the slope of the line $b$ of FIG. 4 is dependent upon the ratio $d/\lambda$; in the experimental embodiment at present under discussion the basic serial system comprised a vertically-extending linear array of eight receiving horns operating at a frequency of 5.1 GHz giving a wavelength of $\lambda = 5.9$ cm. The height, that is to say the vertical dimension, of the aperture of each horn was some 21 cm; with the horns touching this gave a spacing $d$ also of 21 cm. as can of course readily be verified from the slope of the line $b$ of FIG. 4.

From the above discussion and in particular from expression (vii) it can be appreciated the basic angular converage $\theta_o$, that is to say the maximum angle $\theta$ which can be measured without ambiguity and which of course depends upon the geometry of the closest-spaced interferometer pair, is defined by the limiting condition $$2 \pi \pi d \sin \theta/\lambda = \pi$$

(viii)

or $$\sin \theta_o = \lambda/2d$$

which from the parameters defined in the preceding paragraph yields a basic coverage of some eight degrees.

A method of performing the processing defined by expression (vi) will now be described with reference to FIG. 5. As each angle $\phi$ is being defined in a digital code with digital increments of 45°, that is $\pi/4$, then F can only assume eight different numbers and can be expressed as a three-bit pure binary code; although the convenient forms of phase discriminator referred to above provide phase information in four-bit Johnson code, for ease of handling this information is converted to a pure binary code before any logic processes are performed. Thus a phase angle $\phi$ can be indicated by a series of binary digits of which the lower-order digits can represent the fraction F and higher-order digits represent the integer I so that where in expressions (v) and (vi) and in expressions which will be derived later the angle includes a function representing unity or an integral multiple of unity, for example B = 1, this means that one or more unit increments are added to the higher-order digits representing I and the logic circuits therefore will be arranged to do this. Where a function is a multiplying function, for example C in the expression (C.δF) which can only assume the values of either zero or unity it can logically be regarded as a two-state "gating" function and with these conceptions in mind it is then possible to draw a logic diagram which will give effect to the requirements of expression (vi). It is pointed out that because such a diagram can usually be drawn in severeal ways all of which are equally valid and also because portions of the circuit are required to handle series of binary digits as well as perform two-state logic functions, the diagram of FIG. 5 and those of FIGS. 7, 9, 11, 12 and 13 should not be taken to imply the physical existence of appropriate components in the equipment but merely to indicate in a simplified way the logic steps necessary to achieve the desired result.

Figure 5:
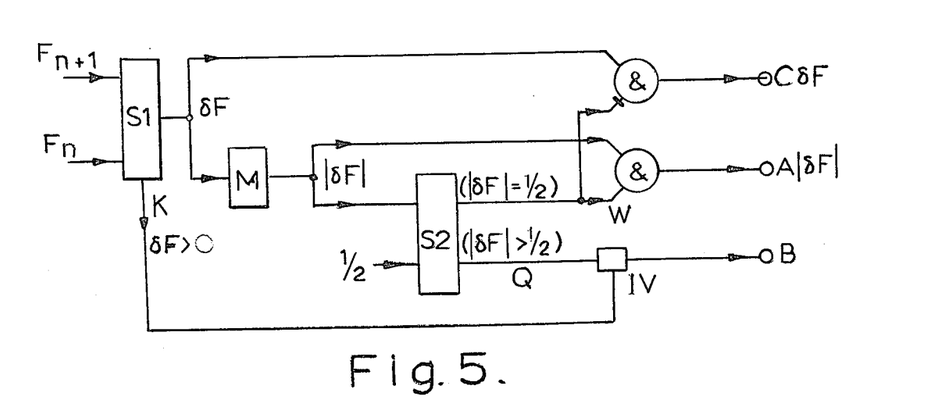
FIG. 5 : illustrates in block diagram form a logic processing arrangement.

Referring now to FIG. 5, which in the main is self-explanatory, binary digits representing $F_n$ and $F_{n+1}$ are applied to a difference or "subtract" stage S1 of which the output is a binary digital signal indicating the function $\delta F = (F_{n+1} - F_n)$; this function is combined in a first AND gate, hereinafter referred to as the δF gate, with the function C so as to provide an output C.δF. The function δF is also applied to a "modulus" stage M which provides a binary digital signal indicating the function /δF/; the function /δF/ is combined in a second AND gate, hereinafter referred to as the /δF/ gate, with the function A so as to provide an output A/δF/. The function /δF/ is also applied to one input of a second difference stage S2 which at its other input receives a binary digital function representing one half. The stage S2 compares its two inputs and provides two signals each of which can assume one of only two states ZERO and ONE; for one signal W a ONE state can only occur if /δF/ = ½ and for the other signal Q from which is derived an output representing the function β of expression (vi) a ONE state can only occur if /δF/ is greater than ½; these conditions for ONE outputs are indicated in FIG. 5. In this simplified diagram it can be seen that the signal W is used to represent the function A so that W = A = $\overline{C}$ whilst the signal Q provides the presence or absence of the function B so that Q = ± B.

The stage S1 also generates a two-state signal K which assumes the state ONE when δF is positive, that is to say greater than zero, and this signal is applied to an inverting stage IV; in the presence of a ONE signal at K the signal Q is inverted, that is to say when Q is ONE then a signal MINUS ONE will appear at the output B so that B can thus assume one of the three states defined for expression (vi).

If /δF/ is less than ½ then signals Q and W from stage S2 are both ZERO; the appearance of a ZERO condition at the /δF/ gate will maintain that gate closed and A and B will both be zero but the ZERO state at the negated input of the δF gate opens that gate to permit the passage of the function δF and provide an output C.δF where C = 1.

If /δF/ = ½ then the function B will again be ZERO; the appearance of a ONE condition at the negated input of the δF gate will close the gate and establish the condition C.δF = 0 and the appearance of a ONE condition at the input to the /δF/ gate will open that gate to provide an output A/δF/ where A = 1.

If /δF/ is greater than ½ the ZERO state of signal W results in the condition A = 0, C = 1 as already described for /δF/ less than ½. The signal Q will be in the ONE state and will pass to the inverting stage VI; if δF is greater than zero signal K will be in the ONE state and the signal Q will be inverted to provide an output B = −1; if δF is less than zero then signal K will be in the SERO state and no inversion will take place, providing an output B = +1.

As has been already described the basic angular coverage $\theta_o$ of some eight degrees is determined by the spacing $d$ between adjacent aerial elements which is of course also the spacing between the elements of the closest-spaced interferometer pair; further, it has always been assumed heretofore that the largest angle unambiguously measurable by an interferometer pair is limited by the geometry of the system in the manner discussed above with reference to expression (iv).

It has been shown that $\phi_{n+1}$ can be determined from $\phi_n$, $F_n$ and $F_{n+1}$ provided that /δφ/ is less than π and that this condition is exceeded when θ is greater than $\theta_o$.

If θ lies in the range between zero and $2\theta_o$ and if no significant ground reflections are present within this range then δφ will lie between 0 and 2π and can be measured unambiguously. In the presence of ground reflections unambiguous measurement is still possible provided that $2\pi d \cdot \sin \theta / \lambda$ is greater than 2G that is to say for elevation angles θ above the "cross-over" point of FIG. 4 which occurs at an angle α of about 2°; thus if α is the angle given by the expression $$2\pi d \sin \alpha / \lambda \ \beta = 2G \tag{ix}$$

then θ can be measured unambiguously within the range α to $2\theta_o$.

Figure 3A:
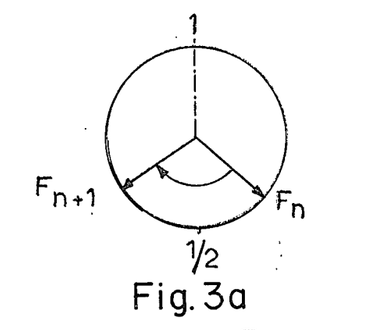
FIGS. 3a to 3d : illustrate four possible vector spreads.
Figure 3B:
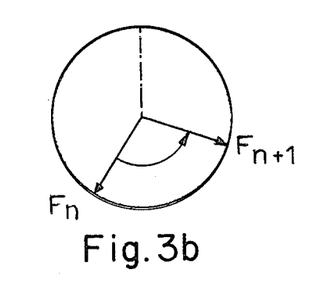
Figure 3C:
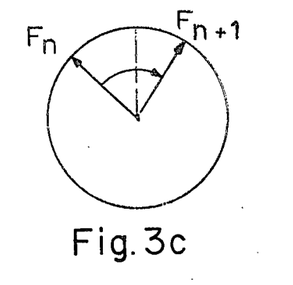
Figure 3D:
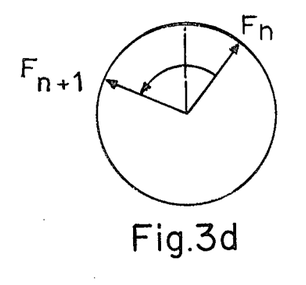
Figure 6A:
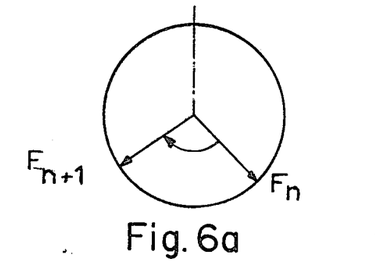
FIGS. 6a to 6d : illustrate further vector spreads.
Figure 6B:
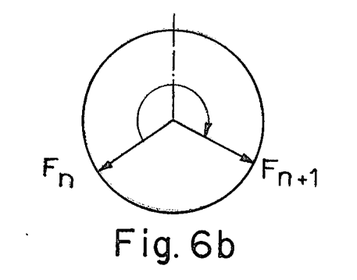
Figure 6C:
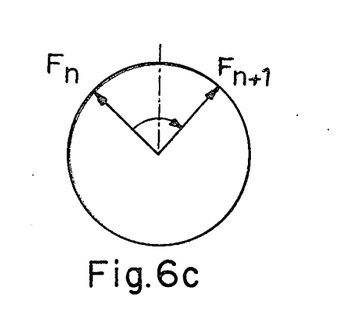
Figure 6D:
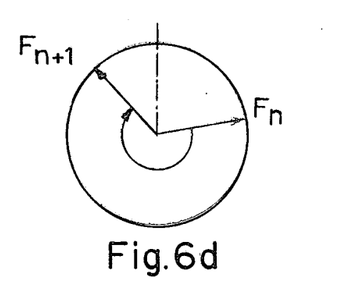

If the angle θ lies in the range between zero and $2\theta_o$ we may establish the proviso that δφ be less than 2π; taking the four examples shown in FIGS. 6a to 6d all of which comply with this proviso it can be seen that in examples I and VI as shown in FIGS. 6a and 6d $I_{n+1} = I_n$ and δF is positive in examples III and V according to FIGS. 6c and 6d $I_{n+1} = I_n + 1$ and δF is negative Examples I and III (FIGS. 6a and 6c) have of course already been encountered in FIGS. 3a and 3c and in examples III and V (FIGS 6b and 6d) the vectors are again spread around the 12 o'clock position in that the angle between them indicated on the FIGS. 6a to 6d for each example includes this position. Thus, following the processes set out earlier, we can propound a second mode of operation in which $\phi_{n+1}$ can be found from the expression $$\delta\phi = (\delta F + B) 2\pi \tag{x}$$

where
B = 1 when δF is negative
and
B = 0 when δF is positive

For the ambiguous condition of coincident vectors $F_{n+1} = F_n$; this occurs when θ approaches zero or $2\theta_o$ and the processing logic has been arranged to resolve this ambiguity in favour of θ = zero giving the further requirement, for δF = 0, that B = 0 in expression (x).

Combining these requirements, the complete processing is as defined in expression (x) but where
a. B = 1 for δF negative
and (b) B = 0 for δF zero or positive A suitable logic-processing arrangement is shown in very simplified block diagram form in FIG. 7: digital quantities representing $F_{n+1}$ and $F_n$ are applied to the inputs of a subtraction stage S1 which provides a binary digital signal representing the function δF and a two-state signal which assumes the ONE state when δF is negative; comparison with FIG. 5 leads to the convenient notation of $\overline{K}$ (not K) for this two-state signal.

So far we have only considered the angular elevation range up to a limit of 2 $\theta_o$ which, bearing in mind the terms of expression (viii), gives a maximum elevation angle $\theta$ defined by the limiting expression $$\sin \theta = \lambda/d$$

which of course is merely another way of incorporating the requirement of unambiguity into expression (iv) and yields a maximum value of $\theta$ which is still no greater than that of expression (iv).

Figure 8A:
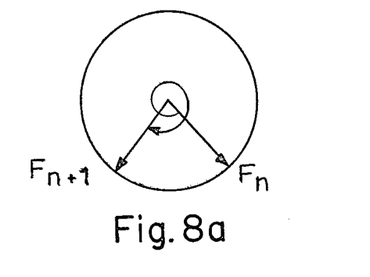
Figure 8B:
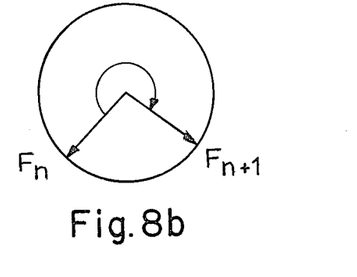
Figure 8C:
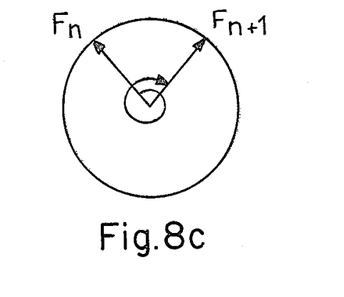
Figure 8D:
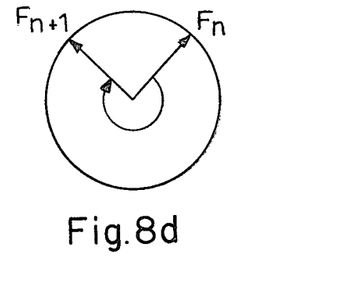

Let us now consider an angle $\theta$ which lies in the range between $\theta_o$ and $3\theta_o$ so that δθ lies in the range π to 3π; taking the four examples in FIGS. 8a and 8d all which comply with this proviso it can be seen that we can propound a third mode of operation in which δφ can once again be defined by general expression (v) but that now the requirements are B = 1 for examples V and VII (FIGS 8a and 8d) where /δF/ is less than ½ and B = 2 for examples VI and VIII (FIGS. 8c and 8d) where /δF/ is more than ½ Examples V and VI (FIGS. 8d and 8b) have already been encountered in FIGS. 6b and 6d.

For the ambiguous condition of vector spreads equal to π the quality /δF/ = ½ once more holds; this occurs when $\theta$ approaches $\theta_o$ or $3\theta_o$ and the processing logic is arranged to resolve this ambiguity in favour of $\theta = \theta_o$ giving the further requirement, for this condition, $$\delta\phi = /\delta F/2\pi$$

Combining these requirements, the complete processing is, again, $$\delta\phi = (A/\delta F/ + B + C\delta F) \, 2\pi$$

(vi)

where a. A = 0, B = 1, C = 1, for /δF/ less than ½
b. A = 1, B = 0, C = 0, for /δF/ = ½
and
c. A = 0, B = 2, C = 1, for /δF/ greater than ½

The similarity of this processing with that derived for the conditions illustrated in FIGS. 3a to 3d is obvious.

Figure 7:
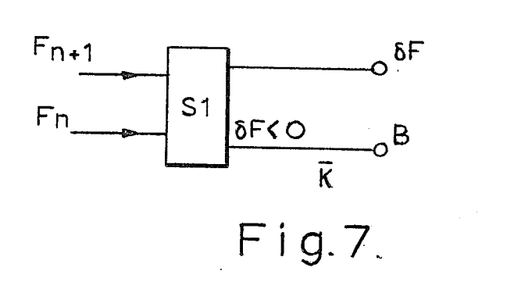
FIG. 7 : illustrates in block diagram form a logic processing arrangement pertaining to FIGS. 6a to 6d FIGS. 8a to 8d : illustrate further vector spreads.

A suitable logic-processing arrangement is shown, again in a simplified manner, in block diagram form in FIG. 9, which, as might be expected, is very similar to FIG. 5 and the operation of this arrangement for the condition /δF/ = ½ is exactly the same as has been described with reference to FIG. 5. FIG. 7 differs from FIG. 5 in that there is no signal K indicating the sign of δF and in that the output B is provided at two terminals of which one indicates the condition B = 1 and the other the condition B = 2; selection of the appropriate output terminal is effected with the aid of a further AND gate, hereinafter referred to as the B gate, having two negated inputs.

If /δF/ is less than ½ the signals W and Q derived from the stage S2 will both be zero so that the B gate will open and provide an output $\overline{W}.\overline{Q}=B=1$.

If /δF/ is greater than ½ then because Q is in the ONE state the B gate will be closed and output Q = B = 2 will be provided.

For all values of /δF/ the δF and /δF/ gates operate in the same manner as that described with reference to FIG. 5.

It can be seen that there are three modes of operation for $\theta$ lying between zero and $\theta_o$
$\theta$ lying between $\alpha$ and $2\theta_o$ and
$\theta$ lying between $\theta_o$ and $3\theta_o$ where $\alpha$ is about 2° and $\theta_o$ is about 8° in the particular embodiment under discussion. For angles between $\alpha$ and $\theta_o$ the first and second modes overlap and for angles between $\theta_o$ and $2\theta_o$ the second and third modes overlap. Within a region of overlap both modes give the same output as can be understood from the inclusion of Examples I and III as shown both in FIGS. 3a, 3c and in FIGS. 6a, 6c and the inclusion of Examples V and VI as shown both FIGS. 6b and 6d and in FIGS. 8b, 8d but by establishing a lower boundary somewhere between $\alpha$ and $\theta_o$ and an upper boundary somewhere between $\theta_o$ and $2\theta_o$ three sectors of operation can be defined. Conveniently, let the lower boundary be half way between $\alpha$ and $\theta_o$ that is to say at 5° and let the upper boundary be half way between $\theta_o$ and $2\theta_o$ that is to say at 12°; the three modes listed above are now operative over three sectors Mode 1: 0 to 5°,
Mode 2: 5 to 12°, and
Mode 3: 12 to 24°

Because within a region of overlap both adjacent modes give the same output, the arrangement for determining which mode of operation is to be used, that is to say the sector definition arrangements, need not be particularly accurate and one simple sector definition arrangement which has been found satisfactory in experimental work will now be described with reference to FIGS. 10 and 11.

Figure 10:
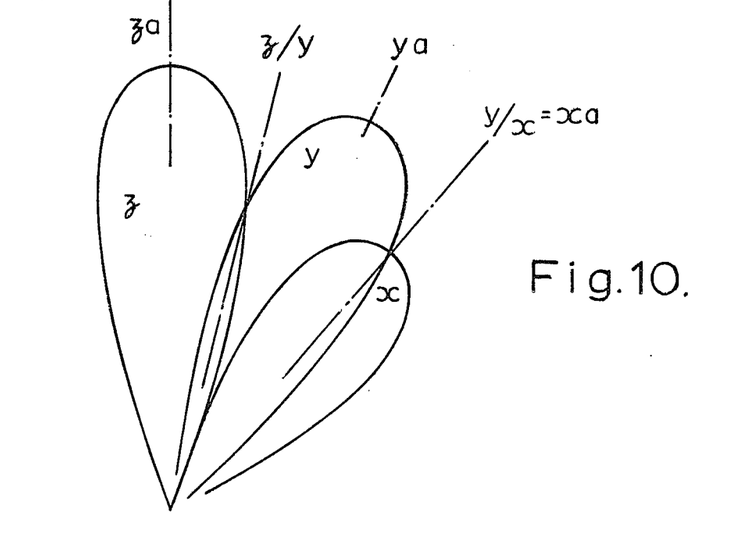

Consider two directional aerials, for example horn aerials, having identical properties but so arranged relative to each other that their beam axes diverge: this is illustrated in FIG. 10 where the beam axis za of a lobe pattern z is at an angle with respect to the beam axis ya of a lobe pattern y: simple amplitude measurements between signals received on the two aerials can then be used to define a boundary indicated as z/y. In a slightly different form of this method the signal received on one of the two horns is attenuated so as to give the relative patterns illustrated at y and x on FIG. 10: here, the boundary y/x occurs along the beam axis xa of the pattern x.

Figure 11:
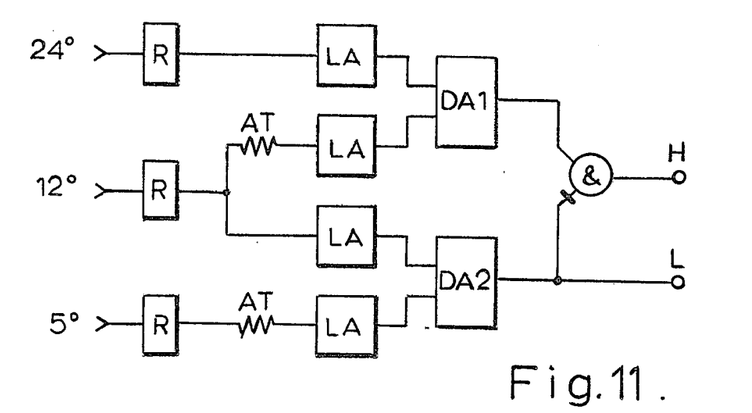
FIG. 11 : illustrates in block diagram form a logic arrangement pertaining to FIG. 10, FIG. 12 : illustrates a combined logic arrangement.

FIG. 11 illustrates in block diagram form a simple arrangement based upon the method of comparing amplitudes between the lobe patterns y and x in FIG. 10. This sector-definition arrangement comprises three receiving horns arranged with their beam axes at angles of 24°, 12° and 5° to the horizontal respectively and these three aerials are referenced on FIG. 11 by their appropriate beam angle. Each aerial feeds a receiver R which includes a mixer stage so that from each receiver the output at a suitable intermediate frequency is passed to the amplitude-comparing arrangements. Considering first the 5° signal this is passed through an attenuator AT to a logarithmic amplifier LA whilst an unattenuated signal from the 12° receiver is passed through a further logarithmic amplifier: the outputs of these two amplifiers are then compared in a differential amplifier DA2 so that we may regard the 5° signal as that corresponding to lobe $x$ in FIG. 10 and the 12° signal as that corresponding to lobe $y$. The differential amplifier DA2 compares the amplitudes of its two inputs and provides at an output terminal L a ONE output when the magnitude of the attenuated 5° signal is greater than that of the 12° signal, thus establishing a sector boundary at an angle $xa$ which is the same as the beam axis of the $x$ lobe pattern, in this case 5°.

The 12° signal is also passed through an attenuator AT to a logarithmic amplifier LA as is also the unattenuated 24° signal and the outputs of this pair of amplifiers is compared in a differential amplifier DA1; here, we may now regard the 24° aerial as having the pattern $y$ and the 12° aerial as having the pattern $x$ so that the sector boundary $xa$ is the same as the beam axis of the 12° aerial, that is to say 12°. The amplifier DA1 is arranged to give a ONE output when the $y$ magnitude is greater than the $x$ magnitude, that is to say it will give a ONE output when the angle $\theta$ is greater than 12°. The output of DA1 is applied to an AND gate which has a second, negated, input from terminal L so that for angles greater than 5° we may regard this AND gate as being prepared by a zero signal at terminal L and for angles above 12° a ONE output from DA1 will pass through this gate and appear at output terminal H. We may thus define a short truth table as follows.

| | |
|---|---|
| $\theta$ less than 5° | : L = 1, H = 0 |
| $\theta$ between 5° and 12° | : L = 0, H = 0 |
| $\theta$ greater than 12° | : L = 0, H = 1 |

Figure 9:
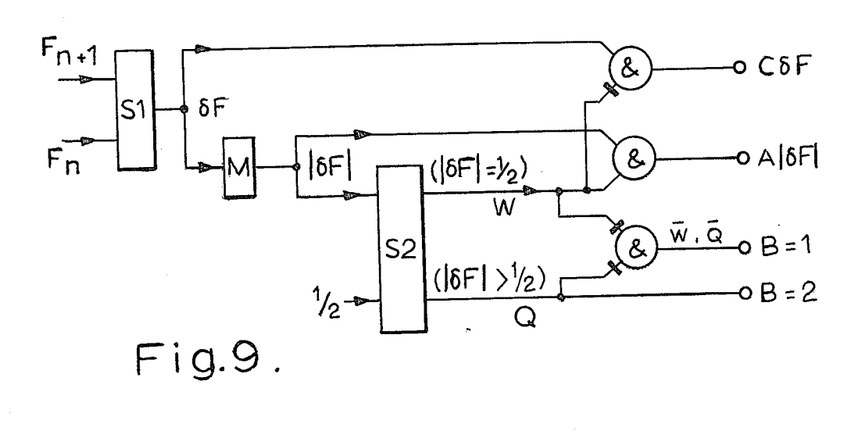
FIG. 9 : illustrates in block diagram form a logic processing arrangement pertaining to FIGS. 8a to 8d FIG. 10 : illustrates a sector definition arrangement.
Figure 12:
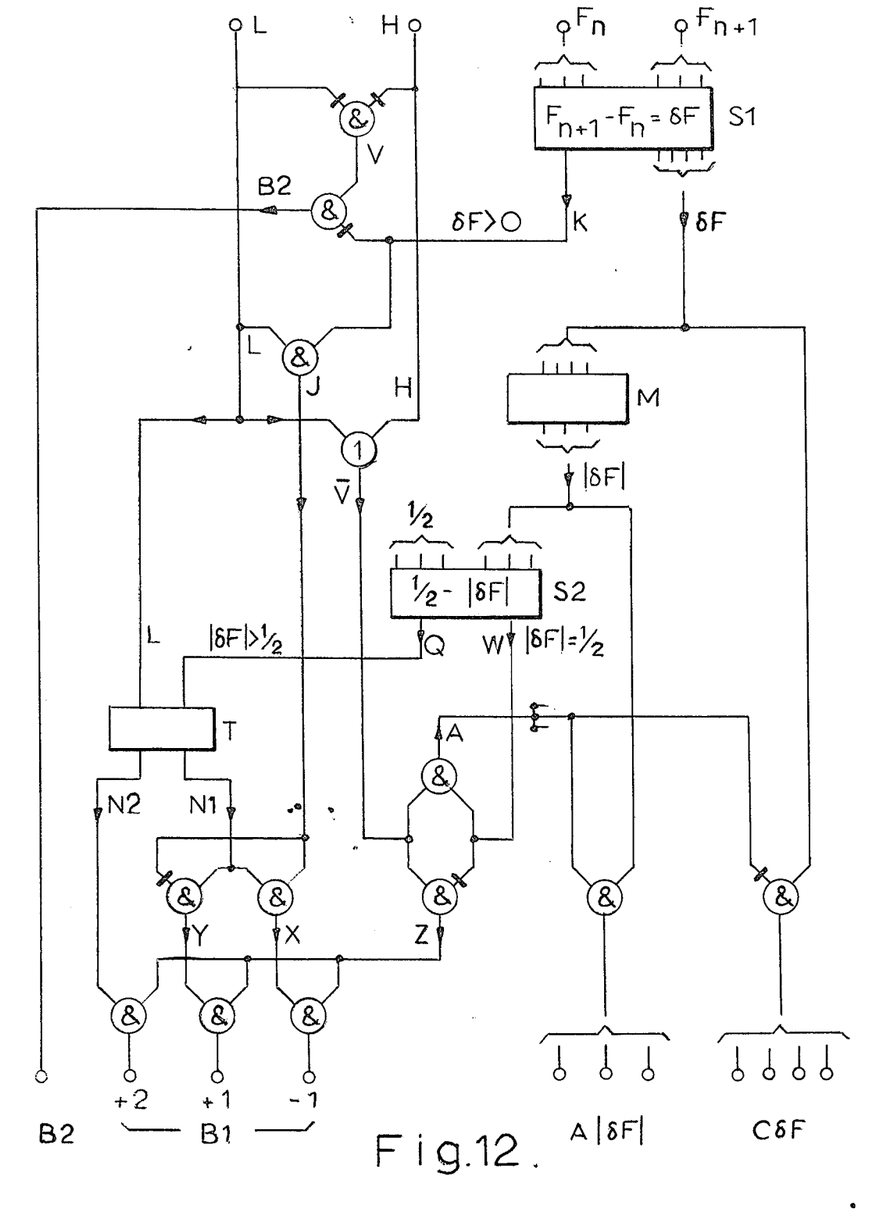

Referring now to FIG. 12 this illustrates the combined logic system incorporating the three arrangements of FIGS. 5, 7 and 9 and also includes logic elements for selecting the appropriate one of the three modes of operation. In this particular arrangement the phase angles are measured in parallel, that is to say simultaneously, so that for the outputs $F_n$ and $F_{n+1}$ from the discriminators we require four lines one for each of the four bits of the Johnson code: however, since it is necessary to be able to indicate negative values of $\delta F$ thus requiring an extra binary digit, and since four-bit logic circuits are readily available, as has been mentioned earlier the outputs from the discriminators are converted from a four-bit Johnson code to a pure three-bit binary code before being applied to the input stage S1. The output from this stage then can be in a four-bit form in which one digit indicate the sign, that is to say positive or negative as the case may be, of $\delta F$ and the other three digits indicate the magnitude of $\delta F$. It will be obvious that the tages and interconnections handling the function $/\delta F/$ do not require the sign-indicating digit. In the diagrams of FIGS. 5, 7 and 9 only a single line is shown for these interconnections but in the diagram of FIG. 12 those parts of the circuit which are required to handle three or four information bits are indicated schematically. These portions of the circuit are those handling the phase information $F_n$, $F_{n+1}$, $\delta F$, $/\delta F/$, and the fraction ½.

As the operation of certain parts of the diagram of FIG. 12 has already been described with reference to FIGS. 5, 7, 9 and 11 the following description in the main will be directed towards indicating how the complete circuit can be made to function according to the particular mode of operation appropriate. In order to select the required mode certain additional logic is necessary and in the following description the convenient convention has been adopted of indicating a gate by the symbol used to indicate the presence of its output signal. Thus, the AND gate at the top of FIG. 12 which has two negated inputs fed from terminals L and H respectively and has an output V is termed the V gate: similarly, the gate fed by signal V and also having a second negated input K, is termed the B2 gate.

In this connection understanding of the logic circuit of FIG. 12 can be assisted by reference to the Table 2 which sets out the logic conditions applicable to the various modes of operation.

The circuit depends for its operation upon four measurements made outside the circuit and two measurements made inside the circuit. Two of the measurements made outside the circuit are those necessary to determine the fractional phases $F_n$ and $F_{n+1}$ and in this particular embodiment these are applied to the circuit as as three-bit pure binary code: the other two measurements are in two-state binary form indicating at L and H the appropriate mode of operation to be selected: the two measurements made inside the circuit are in two-state form and are first that made to determine whether or not the quantity $/\delta F/$ is greater than one half and secondly the measurement made to determine whether $\delta F$ is or is not greater than zero. Of the four measurements made in two-state form, the method of deriving L and H to indicate the mode of operation has already been encountered in FIGS. 10 and 11, the determination of $\delta F$, indicated by the symbol K when $\delta F$ is greater than 0, has already been encountered in FIG. 5 whilst the measurement of the magnitude of $/\delta F/$ and its indication by the symbols Q and W has already been encountered in FIGS. 5 and 9.

In some conditions certain of these measurements are not made: for example, in Mode 2 the state of logic signals W and Q is not relevant, so then in Table 2 where such measurements are not made the appropriate column is indicated by a dash. Where subsequent logic operations depend upon such measurements the relevant column will have a question mark in place of the usual 0 or 1 but it will be seen that in the event the logic is such as to eliminate these questionable conditions so as unambiguously to determine the values of the functions A, B and C.

Let us first consider the operation of the arrangement shown in FIG. 12 for Mode 1, that is to say where the angle $\theta$ is less than 5°. Here, we have a 1 conditions at terminal L and a 0 condition at terminal H giving a 0 output from the V gate a 1 output from the $\overline{V}$ OR gate and also a 1 input L to a stage T: this stage T has not so har been described with reference to previous Figures but at present it will suffice to state that it is a stage which provides from an input of two signals L and Q two outputs N1 and N2 which have the logic that N1 = L.Q + $\overline{L}$.$\overline{Q}$. and that N2 = Q.$\overline{L}$. One arrangement for performing the functions of this stage T will be described later. For Mode 1 therefore we may establish the general conditions L.$\overline{H}$.$\overline{V}$. For operation in sub-made 1 (a) we have the condition that $/\delta F/$ is less than ½ so that W and Q both are in the O state and we arrive at the condition $\overline{V}$.$\overline{W}$. = Z which as can be seen from the Table yields a result A = 0, C = 1. For sub-mode 1 (b) we have the condition $/\delta F/$ = ½ that is to say W = 1 whilst Q still is equal to 0; reference to the Table 2 and FIG. 12 indicates that this yields the result A = 1, C = 0. For sub-mode 1 (c) we have the condition $\bar{K}$ because $\delta F$ is not greater than zero and $/\delta F/$ is greater than ½ so that we have in addition the condition $Q.\bar{W}$, yielding the result A = 0, C = 1: however the appearance of the condition $\bar{V}.W$ will provide a state Z = 1 whilst the condition Q = 1 will provide an output N1: the condition N1. $\bar{J}$ will provide a 1 output from the Y gate and this combined with the condition Z = 1 will provide an output indicating + 1 at the centre of the three B1 terminals. In sub-mode 1 (d) we have the condition that K = 1 so that J = 1 thus providing a 1 output from the X gate, and this combined with the presence of a 1 signal at Z provides an output at the right hand of the three B1 terminals giving the value B1 = 1.

In both sub-modes 1 (c) and 1 (d) the function A = 0 and therefore the function C = 1. Comparison of FIGS. 12 and 5 together with the Table 2 in view of the explanation above will indicate that the requirements of expression (vi) are met for each of the four conditions of Mode 1.

For Mode 2 we have the condition $\bar{L}.\bar{H}. = V$ : if $\delta F$ is positive then for sub-mode 2 (a) we have the condition V.K. giving a +1 output at B2: for $\delta F$ negative there will be no output from the B2 gate giving the net result B = 0. Whatever the sign of $\delta F$ we have the condition $\bar{V} = 1$ so that the A gate remains closed giving A = 0, C =1: this fulfills the requirements of expression (x).

Considering now Mode 3 of operation, we have the condition L = 0 and H = 1 which yields the condition $\bar{V}$; also, $\delta F$ is always greater than zero so that we also have the condition K = 1. The conditions for $\bar{V}$ and for W thus are the same as those for Mode 1 and therefore the $\delta F$ gate and the $/\delta F/$ gate for sub-modes 3 (a), (b) and (c) are the same as those for sub-modes 1 (a), (b) and (c) respectively.

For sub-mode 3 (a) we have the condition $\bar{L}.\bar{Q}.$ giving an output N1 = 1 and this combined with the condition $\bar{J}$ gives a 1 output from the Y gate: this combines with the condition Z = 1 in the middle one of the three B1 gates and yields an output B1 = 1. For sub-mode 3 (b) we have W = 1 so that Z = 0 and all three of the B1 gates are closed yielding an output B1 = 0. For sub-mode 3 (c) the Z gate is again opened whilst the condition $Q.\bar{L}$. will give a 1 output from the N2 gate with the result that the left-hand one of the three B1 gate will be open giving an output indicating B1 =2.

It will of course be apparent that the integral part $\delta I$ of the phase difference $\delta\phi$ is finally represented in digital form by adding together the outputs B1 and B2 by simple logic addition means not shown in FIG. 12 so as to arrive at the net integral part B as set out in Table 2.

Figure 13:
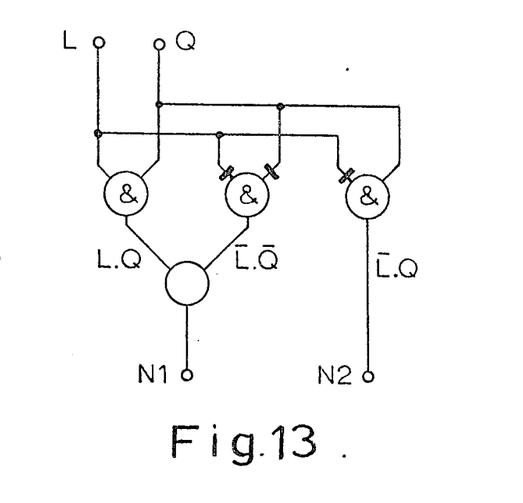
FIG. 13: illustrates a logic stage.

Turning now to FIG. 13 this shows by way of example one arrangement for realizing the stage T referred to in the preceding description of the FIG. 12. In this arrangement this stage is composed of three AND gates and one OR gate; the input and output terminals of this arrangement can readily be identified with the stage T on FIG. 12 whilst the logic operations, which are also indicated on FIG. 13, will also be obvious having regard to those indicated in Table 2; and the previous description of FIG. 12.

Figure 14:
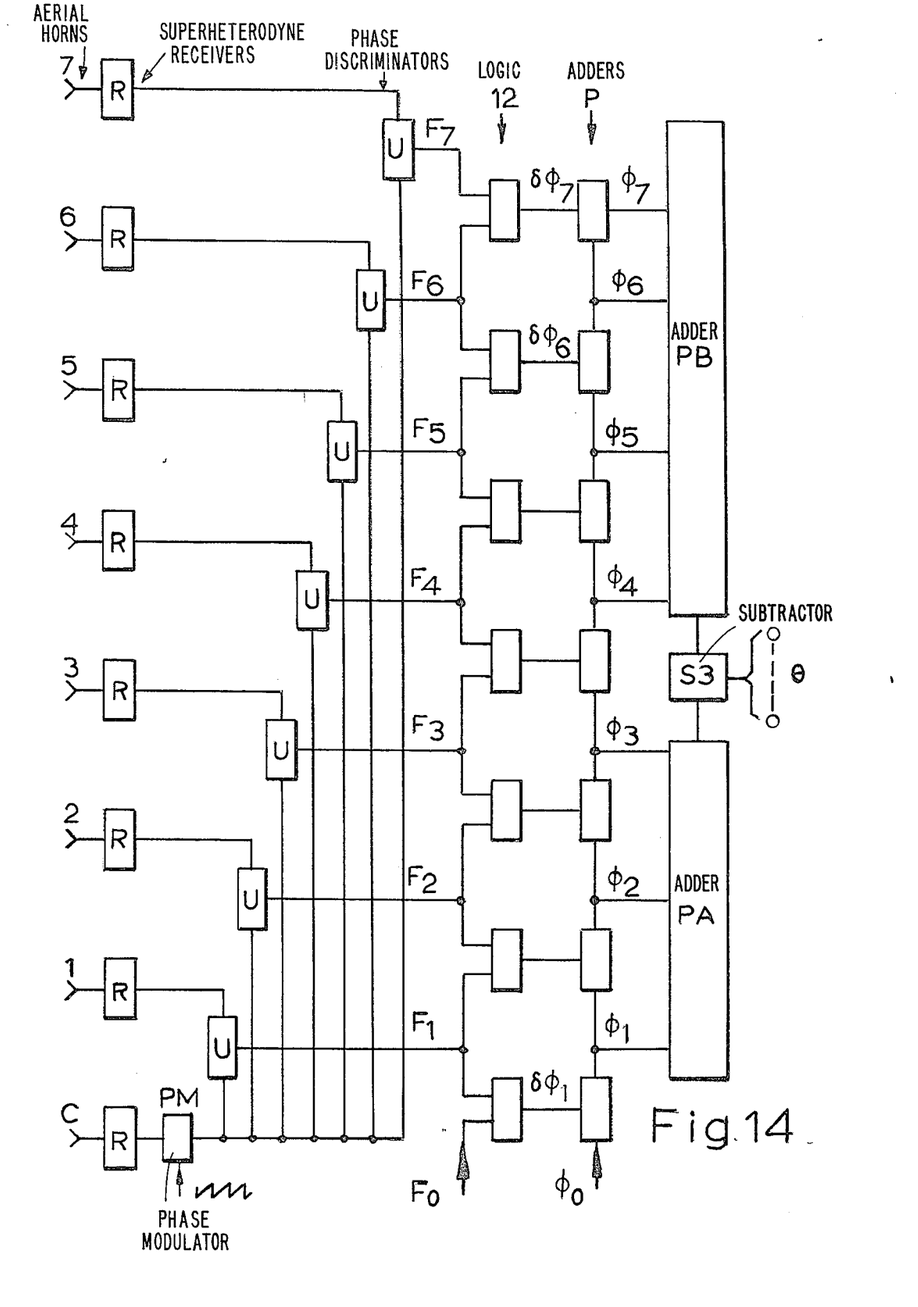
FIG. 14: illustrates the complete system and, FIG. 15 : illustrates part of an interferometer aerial array.

Referring now to FIG. 14 this illustrates the complete equipment, with the exception of the sector-definition arrangement, in block diagram form. At the left-hand side of the Figure are the eight aerial horns with the common aerial C at the bottom and the others being numbered in ascending order, compare FIG. 1. The signal from each horn is amplified in a superhetrodyne receiver R and is applied at intermediate frequency to one of a series of phase discriminators U. Because of the necessity to preserve at the intermediate frequency the relative phase differences in the signals from the aerials, the receivers R are all fed in phase from a common local ascillator source not shown. If desired this source may also supply the three receivers R of the sector-definition arrangement illustrated in FIG. 11 although of course the preservation of phase relationships here is not necessary.

The phase difference between the signal derived from each horn and thus derived from the common horn C is measured by the series of discriminators U which provide a Johnson four-bit digital indication of the fractional phase difference F as already discussed above: these outputs are labelled $F_1$ to $F_7$ respectively and each adjacent pair of outputs corresponds of course to $F_n$ and $F_{n+1}$ referred to earlier. The outputs from these discriminators are then applied through code converters not shown to a series of circuits of the type illustrated in FIG. 12 and indicated on FIG. 14 by this reference numeral, so as to obtain a series of outputs in the from $\delta\phi_n$ where $n$ varies from 1 to 7. In order to preserve symmetry a digital representation of the fractional angle $F_o$, that is to say when $n = 0$, is applied to the bottom one of this column of FIG. 12 circuits. The outputs representing $\delta\phi_n$ are then applied to a chain of adders P so as to obtain outputs of the form $\phi_n = \phi_{n-1} + \delta\phi$ where, again, $n$ extends from 1 to 7: again, in order to preserve symmetry and identity of this chain of circuits, a digital representation corresponding to $\phi_0$ is applied to the bottom one of the chain.

The digital representation of the three phases $\phi_1$, $\phi_2$ and $\phi_3$ are added in a further adder PA and the other four digital phases are added in an adder PB.

As has already been discussed there are several ways of deriving an average of these phase measurements: if we follow the method defined by expression (iii) then the two sums derived by adders PA and PB can be applied to a substracting stage S3 which will incorporate means for taking account of the scaling factor $\beta$. The output from stage S3 thus finally will be in the form of an average angle $\theta$ expressed in a digital code.

If on the other hand it is proposed to use the method defined by expression (iii) (b) then the outputs of the two stages PA and PB will be added and, after taking into account the divisor 28d, and output can again be derived, in digital form, of the phase angle $\theta$.

Although two methods of deriving this average phase angle $\theta$ have been discussed, the simple arithmetical manipulations necessary to cater for other methods of producing such an average will be obvious to those skilled in the art.

There is one further element in FIG. 14 which has so far not been discussed in the present Specification; this is a phase modulator PM which is shown in series with the output from the common aerial receiver to the junction of the discriminators. This phase modulator is in the form of a simple resistor-capacitor phase-shifter where the resistor is voltage-dependent. A ramp generator not shown provides a signal, suitably at about 20 Hz and of triangular waveform and this is applied to the voltage-dependent resistor in the phase modulator. Thus, the phase of the signals entering the modulator from the receiver R is modulated by applying this triangular wave to the phase modulator: suitably, the phase excursion is equal to the digital interval of the phase discriminators U, that is to say in this particular embodiment 45°. The phase of the signal emerging from the phase modulator thus varies over the digital interval and this phase variation, being in the common line, thus influences all of the phase discriminators: when integrated over a number of measurements the digital interval is averaged out and it has been found that by means of this "phase wobble" technique the phase measurements can be made more accurately than the digital interval of 45°.

Figure 15:
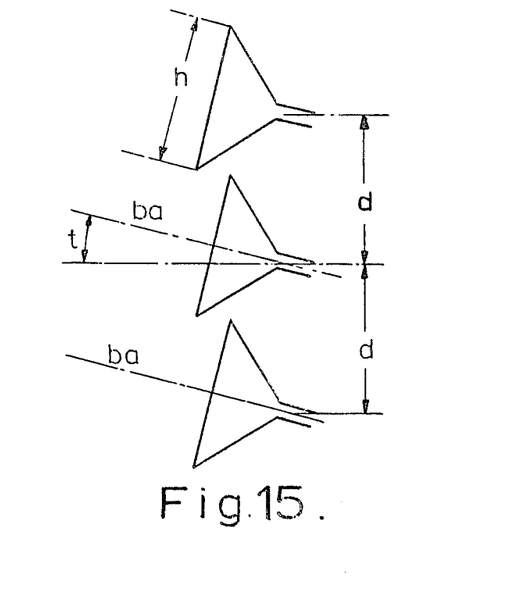

As has already been mentioned with reference to FIG. 1, the aerial arrangement comprises a vertically-extending array of equally-spaced receiver horns and three adjacent horns forming part of an experimental array are illustrated in FIG. 15. In condition array, each horn had a vertical aperture height $h$ of 21 cm. and the beam axis $ba$ of each horn was tilted at an angle $t$ of 11° relative to the horizontal. far

TABLE 1

| | Values of | | | |
|---|---|---|---|---|
| | $-F'$ | $-H'$ | $E'$ | $G'$ |
| $\phi$ | $S(\phi)$ $-C\left(\phi+\dfrac{\pi}{2}\right)$ | $S\left(\phi+\dfrac{\pi}{4}\right)$ $-C\left(\phi+\dfrac{3\pi}{4}\right)$ | $C(\phi)$ | $C\left(\phi+\dfrac{\pi}{4}\right)$ |
| 0 | 0 | 0 | 0 | 0 |
| $\pi/4$ | 0 | 0 | 0 | 1 |
| $\pi/2$ | 0 | 0 | 0 | 1 |
| $3\pi/4$ | 0 | 0 | 1 | 1 |
| $\pi$ | 0 | 1 | 1 | 1 |
| $5\pi/4$ | 1 | 1 | 1 | 1 |
| $3\pi/2$ | 1 | 1 | 1 | 0 |
| $7\pi/4$ | 1 | 1 | 0 | 0 |
| $2\pi$ | 1 | 0 | 0 | 0 |

TABLE 2

| LOGIC SIGNALS | MODES | | | | | | | |
|---|---|---|---|---|---|---|---|---|
| | 1 | | | | 2 | | 3 | |
| | a | b | c | d | a | b | a | b | c |
| $L = \theta < 5°$ | 1 | 1 | 1 | 1 | 0 | 0 | 0 | 0 |
| $H = \theta > 12°$ | 0 | 0 | 0 | 0 | 0 | 0 | 1 | 1 |
| $K = \delta F > 0$ | — | — | 0 | 1 | 0 | 1 | 1 | 1 |
| $W = (/\delta F/ = \frac{1}{2})$ | 0 | 1 | 0 | 0 | — | — | 0 | 1 |
| $Q = (/\delta F/ > \frac{1}{2})$ | 0 | 0 | 1 | 1 | — | — | 0 | 0 |
| $V = \overline{L}.\overline{H}$ | 0 | 0 | 0 | 0 | 1 | 1 | 0 | 0 |
| $J = \overline{L.K}$ | ? | ? | 0 | 1 | 0 | 0 | 0 | 0 |
| $Z = \overline{W.V}$ | 1 | 0 | 1 | 1 | 0 | 0 | 1 | 0 |
| $N1 = L.Q + \overline{L}.\overline{Q}$ | 0 | 0 | 1 | 1 | ? | ? | 1 | 1 |
| $N2 = Q.\overline{L}$ | 0 | 0 | 0 | 0 | ? | ? | 0 | 0 |
| $X = N1.J$ | 0 | 0 | 0 | 1 | 0 | 0 | 0 | 0 |
| $Y = N1.\overline{J}$ | 0 | 0 | 1 | 0 | ? | ? | 1 | 1 |
| $(B1 = -1) = Z.X$ | 0 | 0 | 0 | 1 | 0 | 0 | 0 | 0 |
| $(B1 = +1) = Z.Y$ | 0 | 0 | 1 | 0 | 0 | 0 | 1 | 0 |
| $(B1 = 2) = Z.N2$ | 0 | 0 | 0 | 0 | 0 | 0 | 0 | 0 |
| $B2 = \overline{K}.V$ | 0 | 0 | 0 | 0 | 1 | 0 | 0 | 0 |
| $B = B1$ plus $B2$ | 0 | 0 | +1 | −1 | +1 | 0 | +1 | 0 |
| $A = W.\overline{V}$ | 0 | 1 | 0 | 0 | 0 | 0 | 0 | 0 |
| $\overline{A}$ | 1 | 0 | 1 | 1 | 1 | 1 | 1 | 0 |

What we claim is:

1. A vertical radio interferometer system comprising a vertically-extending rectilinear array of equally-spaced aerial elements forming between a common element and each of the other elements respectively a plurality of interferometer pairs of which the spacing increases in arithmetical progression, a series of phase discriminators each associated with a respective interferometer pair to derive therefrom a respective phase-difference measurement in digital form and digital logic means to derive from the series of respective measurements an average phase measurement representative of the vertical angle $\theta$ of radiation incident on the aerial array.

2. A system as claimed in claim 1, wherein each phase discriminator is operative to compare signals having a phase difference of $\delta\phi = 2\pi(I + F)$ radians where I is an integer and F is a positive fraction and to derive therefrom a digital measurement of the angle $2\pi F$, and wherein the digital logic means is operative to calculate the angle $2\pi I$ and to add thereto the measurement derived by the discriminator to provide a measurement in digital form of the phase difference $\delta\phi$.

3. A system as claimed in claim 2 wherein the digital logic means comprises a series of digital logic stages each associated with a respective pair of adjacent phase discriminators in the series of discriminators and wherein each logic stage is operative to receive the digital measurements from the pair of discriminators and to calculate therefrom the angle $2\pi I$.

4. A system as claimed in claim 3 comprisisng a further digital logic stage associated with only that discriminator which is associated with the closest-spaced interferometer pair.

5. A system as claimed in claim 4 comprising a chain of digital adding stages each arranged to receive the phase-difference measurement of $\delta\phi_n$ from a respective $n$ the logic stage and each, except the first in the chain for which $n = 1$, arranged to receive from the next preceding adding stage a phase measurement of $\phi_{n-1}$ and to add the two measurements together to produce an output representing the phase $\phi_n$.

6. A system as claimed in claim 5 comprising digital averaging means operative to receive from the adding stages measurements of the phases $\phi_1, \phi_2 \ldots \phi_n$ and to derive therefrom an average phase indicative of the vertical angle $\theta$.

7. A system as claimed in claim 6 wherein the digital averaging means is operative to weight the respective phase measurements to derive a weighted average phase indicative of the angle $\theta$.

8. A system as claimed in claim 1 for measuring within a range of angles the vertical angle $\theta$, comprising sector-definition means for dividing the said range into a plurality of sectors and defining within which sector the angle $\theta$ lies.

9. A system as claimed in claim 8 wherein the digital logic means is operative upon receipt of information from the sector-definition means to select from a plurality of logic processes a combination appropriate to the defined sector.

* * * * *